UNITED STATES PATENT OFFICE.

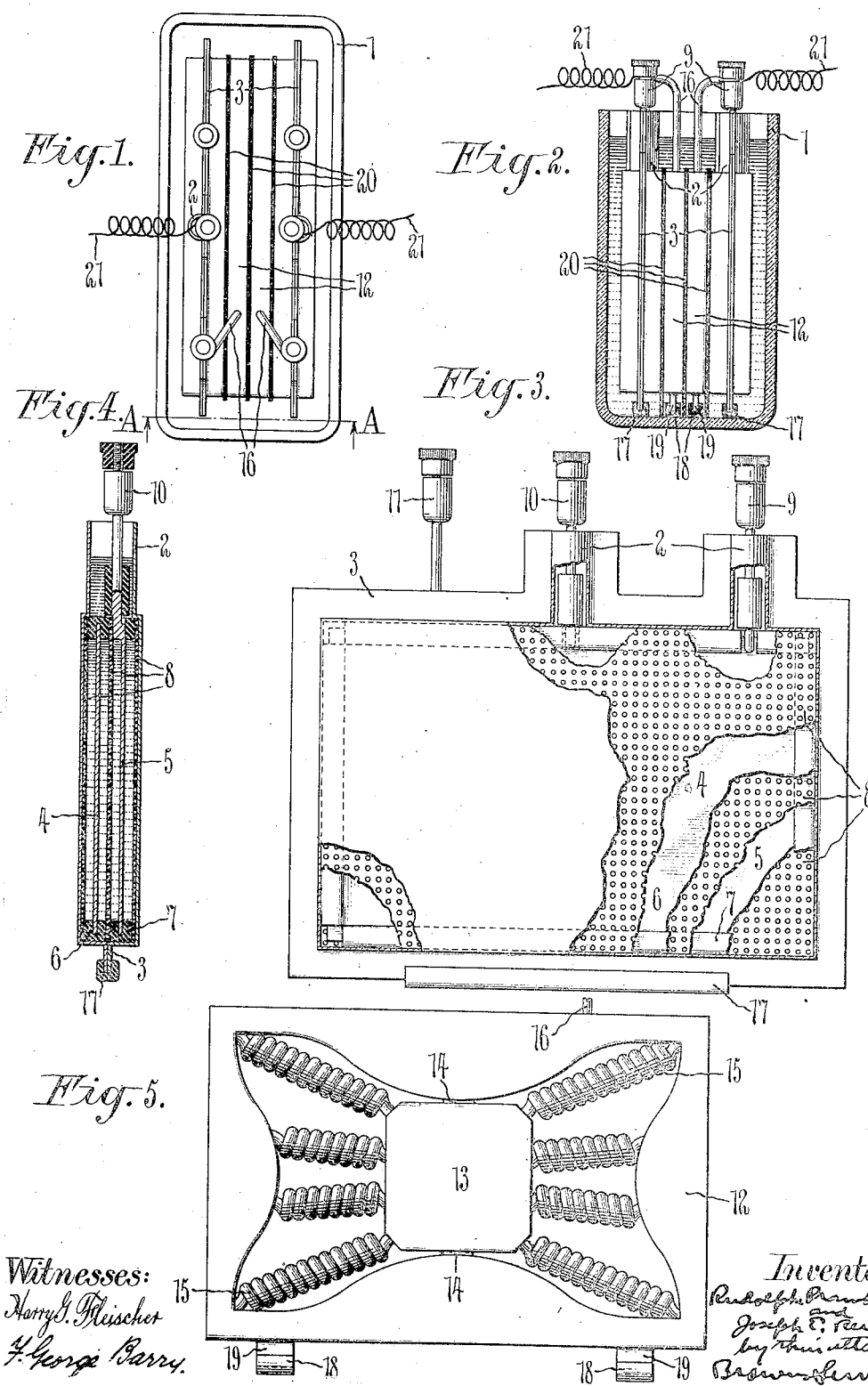

RUDOLPHE DRAMBOURG AND JOSEPH E. REID, OF NEW YORK, N. Y.

STORAGE BATTERY.

1,126,422.   Specification of Letters Patent.   Patented Jan. 26, 1915.

Application filed June 19, 1913. Serial No. 774,657.

*To all whom it may concern:*

Be it known that we, RUDOLPHE DRAMBOURG and JOSEPH E. REID, citizens of the United States, and residents of the borough of Brooklyn, in the city and State of New York, have invented a new and useful Improvement in Storage Batteries, of which the following is a specification.

This invention relates to storage batteries and more particularly to electrodes therefor, with the object in view of providing means for producing a single cell battery of almost unlimited voltage.

Another object is to provide certain improvements in the construction, form and arrangement of the several parts for effectively carrying out the first mentioned object.

In storage batteries it has been necessary to connect up a plurality of cells in order to obtain a high voltage. This has increased the bulk and weight of the battery as a whole to a great extent, these increases negativing the gain and advantages obtained under many circumstances from the higher voltage.

By our invention, which relates to an electrode to be used in storage batteries, it is perfectly feasible to obtain very high voltages from a single cell, and we have found it very practical to make a single cell of twelve or more volts; though this is not by any means the upper limit.

Broadly considered, the construction of our electrode includes a hollow liquid tight shell or casing composed of some suitable lead-like material, and two slabs therein also composed of suitable lead-like material; the two slabs being provided with terminals, and the shell or casing also being provided with a terminal for use under certain conditions. The shell is intended to be filled with electrolyte to cover the two slabs within it.

A practical embodiment of the invention is represented in the accompanying drawing in which, Figure 1 represents a top plan view of a cell including two of our hollow units and two plates. Fig. 2 represents a vertical section taken in the plane of the line A—A of Fig. 1, looking in the direction of the arrows. Fig. 3 represents a side elevation, portions being broken away to show the parts beneath, of one of the hollow units. Fig. 4 represents a vertical section therethrough, and Fig. 5 represents a side elevation of one of the plates.

The cell of the battery is denoted by 1, and may consist of a vessel of glass or other suitable material of any desired form, the form shown being conventional. This cell 1 is adapted to hold electrolyte in which is submerged, in the present instance, two of the hollow units and two plates.

The present invention being directed to the construction of the hollow units, one of these will now be described in detail, reference being had particularly to Figs. 3 and 4, which clearly show the construction.

Each unit comprises a shell or casing 2, which is preferably formed in two halves having peripheral flanges 3, adapted to abut each other and be fused together for holding the two halves firmly in a hollow liquid-tight unit. The shell or casing 2 may be composed of any suitable lead-like material, but we prefer to use material consisting of antimony, iron pyrite (fool's gold) with the mica removed, and lead, in substantially the proportions of five per cent. (5%) antimony, ten per cent. (10%) iron pyrite with the mica removed, and eighty-five per cent. (85%) lead. Within the shell 2, are located two similar flat slabs 4, 5, which are composed of any suitable lead-like material, but preferably of the same material as the shell 2. These slabs 4, 5, have their edges covered by strips 6, 7, of rubber or other appropriate insulating material, the bottom strips being utilized as a means for supporting the slabs 4, 5, on the bottom of the shell 2.

Thin sheets 8 of insulating material, such as perforated hard rubber, are also interposed between the two slabs 4, 5, and between each slab 4 and 5 and the adjacent wall of the shell 2, in order to positively prevent any buckling of the slabs, which might arise from careless handling, from bringing about electrical contact between the slabs 4 and 5, or between either slab and the shell 2.

The slab 4 may be provided with a suitable terminal 9, the slab 5 with a suitable terminal 10, and the shell 2 with a suitable terminal 11.

Referring now to the plate shown in Fig. 5, it comprises a hollow frame 12, a center piece 13, held in the frame 12 by neck pieces 14; and coils of wire 15 connecting the frame 12 and center piece 13. Both the frame and center piece are solid and flat, and they, as well as the coils of wire 15, are all composed of suitable lead-like material, and preferably of the same composition as recited above in connection with the shell 2, and slabs 4, 5, of the high voltage plate. Tests have shown this form of plate to be considerably higher in amperage than previous plates of the same area and thickness. This plate may be provided with a suitable connecting wire 16.

Referring now to the battery as a whole, in the form shown in the drawings, two of the hollow units are placed in the cell 1, being supported on the bottom thereof by insulating strips 17 fitted on their flanges 3. Interposed between these two units are two of the plates which are also supported on the bottom of the cell 1, by suitable insulating strips 18, engaging legs 19 on the said plates. Three sheets 20 of insulating material, such as rubber, are positioned so as to keep the four electrodes out of electrical contact with each other. As thus constructed, the terminal 10 on the slab 5 in one of the hollow units, constitutes the positive terminal for the cell as a whole, and the terminal 10 on the slab 5 in the other hollow unit constitutes the negative terminal of the cell as a whole. These terminals may be connected by wires 21, in any desired manner for utilizing the energy of the cell. The slab 4 in one of the hollow units may be connected by the wire 16, with one of the plates; and the slab 4 in the other hollow unit may be connected with the other plate by the other wire 16. As thus constituted, the slab 5 in one of the units is positive in character, and the shell 2 of that unit is also positive in character. The slab 4 in the same unit is negative in character and the plate to which it is connected is negative in character. The slab 5 in the other hollow unit will be negative in character, and the shell of that unit will also be negative in character; while the slab 4 in that plate will be positive in character, and the plate to which it is connected, will be positive in character. Each of the slabs 4, 5, will deliver one volt, each of the shells 2 one volt, and each of the plates one volt. Therefore, this cell will deliver eight volts. It will be remarked that the voltage of the cell may be indefinitely increased by adding more of the hollow units, and the amperage may be greatly increased by adding more of the plates. However, mention should be made of the fact that the plates will only give two volts, no matter how many may be used.

The cell and the hollow units are, as indicated above, filled with suitable electrolyte; and we prefer to use an electrolyte which comprises bichromate of potash, sulfuric acid and water in substantially the proportions of five per cent. (5%) bichromate of potash, twenty per cent. (20%) sulfuric acid and seventy-five per cent. (75%) water.

By our invention we are enabled to get a single cell battery of extremely high voltage; and the increase in weight and bulk is not more than substantially one half the increase in weight and bulk required in connecting separate cells of two volts each so as to form a battery producing the same voltage as our single cell.

We desire it to be understood that various changes may be resorted to in the form, construction, composition and arrangement of the several parts without departing from the spirit and scope of our invention, and hence we do not wish to limit ourselves to the form herein shown and described, except as it may be specifically set forth in the claims.

What we claim is:

1. A storage battery comprising a cell filled with electrolyte, and a plurality of electrodes within said cell immersed in said electrolyte, each of said electrodes consisting of a hollow casing filled with electrolyte and a plurality of slabs within said casing immersed in the electrolyte, a slab in one casing constituting one pole of the battery and a slab in another casing constituting the other pole of the battery.

2. A storage battery comprising a cell filled with electrolyte, and a plurality of electrodes within said cell immersed in said electrolyte, each of said electrodes consisting of a hollow casing filled with electrolyte and a pair of slabs within said casing immersed in the electrolyte, said slabs being of different polarity and one of said slabs being of the same polarity as the casing, a slab in one casing constituting one pole of the battery and a slab in the other casing constituting the other pole of the battery.

In testimony, that we claim the foregoing as our invention, we have signed our names in presence of two witnesses, this eleventh day of June, 1913.

RUDOLPHE DRAMBOURG.
JOSEPH E. REID.

Witnesses:
F. GEORGE BARRY,
HENRY C. THIEME.